United States Patent
Jeddeloh (10) Patent No.: US 7,389,364 B2
(45) Date of Patent: Jun. 17, 2008

(54) APPARATUS AND METHOD FOR DIRECT MEMORY ACCESS IN A HUB-BASED MEMORY SYSTEM

(75) Inventor: Joseph M. Jeddeloh, Shoreview, MN (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 10/625,132

(22) Filed: Jul. 22, 2003

(65) Prior Publication Data

US 2005/0021884 A1    Jan. 27, 2005

(51) Int. Cl.
*G06F 3/00* (2006.01)
(52) U.S. Cl. .......................... 710/22; 711/100
(58) Field of Classification Search ............ 710/20–22, 710/308; 711/1, 2, 5, 100
See application file for complete search history.

(56) References Cited

U.S. PATENT DOCUMENTS

| | | | |
|---|---|---|---|
| 4,045,781 A | 8/1977 | Levy et al. .................. 364/200 |
| 4,240,143 A | 12/1980 | Besemer et al. ............ 364/200 |
| 4,245,306 A | 1/1981 | Besemer et al. ............ 364/200 |
| 4,253,144 A | 2/1981 | Bellamy et al. ............ 364/200 |
| 4,253,146 A | 2/1981 | Bellamy et al. ............ 364/200 |
| 4,608,702 A | 8/1986 | Hirzel et al. ................ 375/110 |
| 4,641,249 A | 2/1987 | Gion et al. .................. 364/496 |
| 4,707,823 A | 11/1987 | Holdren et al. ................ 370/1 |
| 4,724,520 A | 2/1988 | Athanas et al. ............. 364/200 |
| 4,891,808 A | 1/1990 | Williams .................... 370/112 |
| 4,930,128 A | 5/1990 | Suzuki et al. ................ 371/12 |
| 4,953,930 A | 9/1990 | Ramsey et al. .......... 350/96.11 |
| 4,989,113 A | 1/1991 | Hull, Jr. et al. ............. 364/200 |
| 5,241,506 A | 8/1993 | Motegi et al. .............. 365/210 |
| 5,243,703 A | 9/1993 | Farmwald et al. .......... 395/325 |
| 5,251,303 A | 10/1993 | Fogg, Jr. et al. ............ 395/275 |

(Continued)

FOREIGN PATENT DOCUMENTS

EP    0849685 A2    6/1998

(Continued)

OTHER PUBLICATIONS

Jones, Refugiom Throughput Expansion with FET Based Crossbar Swithcing, Nov. 12, 2001, pp. 1-5.*

(Continued)

*Primary Examiner*—Erin J Sorrell
(74) *Attorney, Agent, or Firm*—Dorsey & Whitney LLP (57) ABSTRACT

A memory hub for a memory module having a DMA engine for performing DMA operations in system memory. The memory hub includes a link interface for receiving memory requests for access at least one of the memory devices of the system memory, and further including a memory device interface for coupling to the memory devices, the memory device interface coupling memory requests to the memory devices for access to at least one of the memory devices. A switch for selectively coupling the link interface and the memory device interface is further included in the memory hub. Additionally, a direct memory access (DMA) engine is coupled through the switch to the memory device interface to generate memory requests for access to at least one of the memory devices to perform DMA operations.

34 Claims, 4 Drawing Sheets

U.S. PATENT DOCUMENTS

| | | | |
|---|---|---|---|
| 5,269,022 A | 12/1993 | Shinjo et al. | 395/700 |
| 5,317,752 A | 5/1994 | Jewett et al. | 395/750 |
| 5,319,755 A | 6/1994 | Farmwald et al. | 395/325 |
| 5,327,553 A | 7/1994 | Jewett et al. | 395/575 |
| 5,355,391 A | 10/1994 | Horowitz et al. | 375/36 |
| 5,388,265 A | 2/1995 | Volk | 395/750 |
| 5,432,823 A | 7/1995 | Gasbarro et al. | 375/356 |
| 5,432,907 A | 7/1995 | Picazo, Jr. et al. | 395/200 |
| 5,442,770 A | 8/1995 | Barratt | 395/403 |
| 5,446,741 A | 8/1995 | Boldt et al. | 371/21.1 |
| 5,461,627 A | 10/1995 | Rypinski | 370/95.2 |
| 5,465,229 A | 11/1995 | Bechtolsheim et al. | 345/477 |
| 5,479,370 A | 12/1995 | Furuyama et al. | 365/189.12 |
| 5,497,476 A | 3/1996 | Oldfield et al. | 395/439 |
| 5,502,621 A | 3/1996 | Schumacher et al. | 361/760 |
| 5,544,319 A | 8/1996 | Acton et al. | 395/200.07 |
| 5,546,591 A | 8/1996 | Wurzburg et al. | 395/750 |
| 5,566,325 A | 10/1996 | Bruce, II et al. | 395/494 |
| 5,577,220 A | 11/1996 | Combs et al. | 395/416 |
| 5,581,767 A | 12/1996 | Katsuki et al. | 395/800 |
| 5,606,717 A | 2/1997 | Farmwald et al. | 395/856 |
| 5,621,883 A | 4/1997 | Thoulon et al. | 395/182.07 |
| 5,638,334 A | 6/1997 | Farmwald et al. | 365/230.03 |
| 5,638,534 A | 6/1997 | Mote, Jr. | 395/485 |
| 5,644,784 A | 7/1997 | Peek | 395/844 |
| 5,659,798 A | 8/1997 | Blumrich et al. | 395/846 |
| 5,706,224 A | 1/1998 | Srinivasan et al. | 365/49 |
| 5,710,733 A | 1/1998 | Chengson et al. | 365/52 |
| 5,715,456 A | 2/1998 | Bennett et al. | 395/652 |
| 5,729,709 A | 3/1998 | Harness | 395/405 |
| 5,748,616 A | 5/1998 | Riley | 370/242 |
| 5,796,413 A | 8/1998 | Shipp et al. | 345/522 |
| 5,818,844 A | 10/1998 | Singh et al. | 370/463 |
| 5,819,304 A | 10/1998 | Nilsen et al. | 711/5 |
| 5,822,255 A | 10/1998 | Uchida | 365/194 |
| 5,832,250 A | 11/1998 | Whittaker | 395/471 |
| 5,875,352 A | 2/1999 | Gentry et al. | 395/843 |
| 5,875,454 A | 2/1999 | Craft et al. | 711/113 |
| 5,881,072 A | 3/1999 | Dell | 371/40.11 |
| 5,887,159 A | 3/1999 | Burrows | 395/567 |
| 5,889,714 A | 3/1999 | Schumann et al. | 365/203 |
| 5,893,089 A | 4/1999 | Kikinis | 707/3 |
| 5,928,343 A | 7/1999 | Farmwald et al. | 710/104 |
| 5,944,800 A | 8/1999 | Mattheis et al. | 710/23 |
| 5,963,942 A | 10/1999 | Igata | 707/6 |
| 5,966,724 A | 10/1999 | Ryan | 711/105 |
| 5,973,935 A | 10/1999 | Schoenfeld et al. | 361/813 |
| 5,973,951 A | 10/1999 | Bechtolsheim et al. | 365/52 |
| 5,978,567 A | 11/1999 | Rebane et al. | 395/200.49 |
| 5,987,196 A | 11/1999 | Noble | 385/14 |
| 6,011,741 A | 1/2000 | Wallace et al. | 365/221 |
| 6,023,726 A | 2/2000 | Saksena | 709/219 |
| 6,023,738 A | 2/2000 | Priem et al. | 710/23 |
| 6,029,250 A | 2/2000 | Keeth | 713/400 |
| 6,031,241 A | 2/2000 | Silfvast et al. | 250/504 R |
| 6,033,951 A | 3/2000 | Chao | 438/253 |
| 6,061,263 A | 5/2000 | Boaz et al. | 365/51 |
| 6,061,296 A | 5/2000 | Ternullo, Jr. et al. | 365/233 |
| 6,067,262 A | 5/2000 | Irrinki et al. | 365/201 |
| 6,073,190 A | 6/2000 | Rooney | 710/56 |
| 6,076,139 A | 6/2000 | Welker et al. | 711/104 |
| 6,079,008 A | 6/2000 | Clery, III | 712/11 |
| 6,092,158 A | 7/2000 | Harriman et al. | 711/151 |
| 6,098,158 A | 8/2000 | Lay et al. | 711/162 |
| 6,105,075 A | 8/2000 | Ghaffari | 710/5 |
| 6,118,719 A | 9/2000 | Dell et al. | 365/222 |
| 6,125,431 A | 9/2000 | Kobayashi | 711/154 |
| 6,128,703 A | 10/2000 | Bourekas et al. | 711/138 |
| 6,131,149 A | 10/2000 | Lu et al. | 711/167 |
| 6,134,624 A | 10/2000 | Burns et al. | 710/131 |
| 6,137,709 A | 10/2000 | Boaz et al. | 365/51 |
| 6,144,587 A | 11/2000 | Yoshida | 365/189.05 |
| 6,167,465 A | 12/2000 | Parvin et al. | 710/22 |
| 6,167,486 A | 12/2000 | Lee et al. | 711/120 |
| 6,175,571 B1 | 1/2001 | Haddock et al. | 370/423 |
| 6,185,352 B1 | 2/2001 | Hurley | 385/114 |
| 6,185,676 B1 | 2/2001 | Poplingher et al. | 712/239 |
| 6,186,400 B1 | 2/2001 | Dvorkis et al. | 235/462.45 |
| 6,191,663 B1 | 2/2001 | Hannah | 333/17.3 |
| 6,201,724 B1 | 3/2001 | Ishizaki et al. | 365/49 |
| 6,208,180 B1 | 3/2001 | Fisch et al. | 327/141 |
| 6,219,725 B1 | 4/2001 | Diehl et al. | 710/26 |
| 6,223,301 B1 | 4/2001 | Santeler et al. | 714/6 |
| 6,233,376 B1 | 5/2001 | Updegrove | 385/14 |
| 6,243,769 B1 | 6/2001 | Rooney | 710/56 |
| 6,243,831 B1 | 6/2001 | Mustafa et al. | 714/24 |
| 6,246,618 B1 | 6/2001 | Yamamoto et al. | 365/200 |
| 6,247,107 B1 | 6/2001 | Christie | 711/216 |
| 6,249,802 B1 | 6/2001 | Richardson et al. | 709/200 |
| 6,256,692 B1 | 7/2001 | Yoda et al. | 710/104 |
| 6,272,609 B1 | 8/2001 | Jeddeloh | 711/169 |
| 6,275,914 B1 | 8/2001 | Jeddeloh | 711/158 |
| 6,285,349 B1 | 9/2001 | Smith | 345/147 |
| 6,286,083 B1 | 9/2001 | Chin et al. | 711/151 |
| 6,294,937 B1 | 9/2001 | Crafts et al. | 327/158 |
| 6,301,637 B1 | 10/2001 | Krull et al. | 711/112 |
| 6,327,642 B1 | 12/2001 | Lee et al. | 711/120 |
| 6,330,205 B2 | 12/2001 | Shimizu et al. | 365/230.06 |
| 6,347,055 B1 | 2/2002 | Motomura | 365/189.05 |
| 6,349,363 B2 | 2/2002 | Cai et al. | 711/129 |
| 6,356,573 B1 | 3/2002 | Jonsson et al. | 372/46 |
| 6,367,074 B1 | 4/2002 | Bates et al. | 717/11 |
| 6,370,068 B2 | 4/2002 | Rhee | 365/196 |
| 6,370,601 B1 * | 4/2002 | Baxter | 710/65 |
| 6,370,611 B1 | 4/2002 | Callison et al. | 711/105 |
| 6,373,777 B1 | 4/2002 | Suzuki | 365/230.03 |
| 6,381,190 B1 | 4/2002 | Shinkai | 365/230.03 |
| 6,389,514 B1 | 5/2002 | Rokicki | 711/136 |
| 6,392,653 B1 | 5/2002 | Malandain et al. | 345/501 |
| 6,401,149 B1 | 6/2002 | Dennin et al. | 710/58 |
| 6,401,213 B1 | 6/2002 | Jeddeloh | 713/401 |
| 6,405,280 B1 | 6/2002 | Ryan | 711/105 |
| 6,421,744 B1 | 7/2002 | Morrison et al. | 710/22 |
| 6,430,696 B1 | 8/2002 | Keeth | 713/503 |
| 6,433,785 B1 | 8/2002 | Garcia et al. | 345/531 |
| 6,434,635 B1 | 8/2002 | Case et al. | 710/23 |
| 6,434,639 B1 | 8/2002 | Haghighi | 710/39 |
| 6,434,696 B1 | 8/2002 | Kang | 713/2 |
| 6,434,736 B1 | 8/2002 | Schaecher et al. | 716/17 |
| 6,438,622 B1 | 8/2002 | Haghighi et al. | 710/1 |
| 6,438,668 B1 | 8/2002 | Esfahani et al. | 711/165 |
| 6,449,308 B1 | 9/2002 | Knight, Jr. et al. | 375/212 |
| 6,453,393 B1 | 9/2002 | Holman et al. | 711/154 |
| 6,460,114 B1 | 10/2002 | Jeddeloh | 711/120 |
| 6,462,978 B2 | 10/2002 | Shibata et al. | 365/63 |
| 6,463,059 B1 | 10/2002 | Movshovich et al. | 370/389 |
| 6,470,422 B2 | 10/2002 | Cai et al. | 711/129 |
| 6,473,828 B1 | 10/2002 | Matsui | 711/104 |
| 6,477,592 B1 | 11/2002 | Chen et al. | 710/52 |
| 6,477,614 B1 * | 11/2002 | Leddige et al. | 711/5 |
| 6,477,621 B1 | 11/2002 | Lee et al. | 711/120 |
| 6,479,322 B2 | 11/2002 | Kawata et al. | 438/109 |
| 6,490,188 B2 | 12/2002 | Nuxoll et al. | 365/63 |
| 6,493,803 B1 | 12/2002 | Pham et al. | 711/147 |
| 6,496,193 B1 | 12/2002 | Surti et al. | 345/552 |
| 6,496,909 B1 | 12/2002 | Schimmel | 711/163 |
| 6,501,471 B1 | 12/2002 | Venkataraman et al. | 345/424 |
| 6,505,287 B2 | 1/2003 | Uematsu | 711/170 |
| 6,523,092 B1 | 2/2003 | Fanning | 711/134 |
| 6,523,093 B1 | 2/2003 | Bogin et al. | 711/137 |
| 6,526,483 B1 | 2/2003 | Cho et al. | 711/154 |
| 6,539,490 B1 | 3/2003 | Forbes et al. | 713/401 |
| 6,552,564 B1 | 4/2003 | Forbes et al. | 326/30 |
| 6,564,329 B1 | 5/2003 | Cheung et al. | 713/322 |

| | | | | | |
|---|---|---|---|---|---|
| 6,587,912 B2 | 7/2003 | Leddige et al. ............... 711/5 | 2002/0116588 A1 | 8/2002 | Beckert et al. ............. 711/161 |
| 6,590,816 B2 | 7/2003 | Perner ...................... 365/200 | 2002/0144027 A1 | 10/2002 | Schmisseur ................. 710/22 |
| 6,594,713 B1 | 7/2003 | Fuoco et al. ............... 710/31 | 2002/0144064 A1 | 10/2002 | Fanning ..................... 711/144 |
| 6,594,722 B1 | 7/2003 | Willke, II et al. .......... 710/313 | 2002/0178319 A1 | 11/2002 | Sanchez-Olea ............ 710/305 |
| 6,598,154 B1 | 7/2003 | Vaid et al. ................. 712/237 | 2003/0005223 A1 | 1/2003 | Coulson et al. ............. 711/118 |
| 6,615,325 B2 | 9/2003 | Mailloux et al. ........... 711/154 | 2003/0023840 A1 | 1/2003 | Zitlaw et al. .................. 713/1 |
| 6,622,227 B2 | 9/2003 | Zumkehr et al. ........... 711/167 | 2003/0043158 A1 | 3/2003 | Wasserman et al. ........ 345/545 |
| 6,628,294 B1 | 9/2003 | Sadowsky et al. .......... 345/568 | 2003/0043426 A1 | 3/2003 | Baker et al. ................. 359/109 |
| 6,629,220 B1 | 9/2003 | Dyer ......................... 711/158 | 2003/0065836 A1 | 4/2003 | Pecone ...................... 710/62 |
| 6,631,440 B2 | 10/2003 | Jenne et al. ................. 711/105 | 2003/0093630 A1 | 5/2003 | Richard et al. ............. 711/154 |
| 6,636,110 B1 | 10/2003 | Ooishi et al. ............... 327/565 | 2003/0095559 A1 | 5/2003 | Sano et al. .................. 370/419 |
| 6,646,929 B1 | 11/2003 | Moss et al. ................. 365/194 | 2003/0149809 A1* | 8/2003 | Jensen et al. ................. 710/22 |
| 6,647,470 B1 | 11/2003 | Janzen ....................... 711/154 | 2003/0163649 A1 | 8/2003 | Kapur et al. ................ 711/146 |
| 6,658,509 B1 | 12/2003 | Bonella et al. ............. 710/100 | 2003/0177320 A1 | 9/2003 | Sah et al. .................... 711/158 |
| 6,662,304 B2 | 12/2003 | Keeth et al. ................ 713/400 | 2003/0193927 A1 | 10/2003 | Hronik ....................... 370/351 |
| 6,665,202 B2 | 12/2003 | Lindahl et al. .............. 365/49 | 2003/0217053 A1 | 11/2003 | Nino, Jr. et al. ........... 711/105 |
| 6,667,895 B2 | 12/2003 | Jang et al. ................... 365/63 | 2003/0227798 A1 | 12/2003 | Pax ......................... 365/189.12 |
| 6,681,292 B2 | 1/2004 | Creta et al. ................. 711/119 | 2003/0229762 A1 | 12/2003 | Maiyuran et al. ........... 711/137 |
| 6,697,926 B2 | 2/2004 | Johnson et al. ............. 711/167 | 2003/0229770 A1 | 12/2003 | Jeddeloh .................... 711/213 |
| 6,715,018 B2 | 3/2004 | Farnworth et al. .......... 710/300 | 2003/0235099 A1 | 12/2003 | Mori et al. .................. 365/202 |
| 6,718,440 B2 | 4/2004 | Maiyuran et al. ........... 711/137 | 2004/0008545 A1 | 1/2004 | Korotkov et al. ....... 365/189.05 |
| 6,721,195 B2 | 4/2004 | Brunelle et al. ............. 365/63 | 2004/0022094 A1 | 2/2004 | Radhakrishnan et al. ... 365/200 |
| 6,724,685 B2 | 4/2004 | Braun et al. ................. 365/233 | 2004/0024959 A1 | 2/2004 | Taylor ........................ 711/105 |
| 6,725,349 B2 | 4/2004 | Langendorf et al. ........ 711/170 | 2004/0044833 A1 | 3/2004 | Ryan ............................. 711/5 |
| 6,728,800 B1 | 4/2004 | Lee et al. ..................... 710/54 | 2004/0047169 A1 | 3/2004 | Lee et al. ..................... 365/63 |
| 6,735,679 B1 | 5/2004 | Herbst et al. ............... 711/167 | 2004/0064602 A1 | 4/2004 | George ....................... 710/22 |
| 6,735,682 B2 | 5/2004 | Segelken et al. ........... 711/220 | 2004/0126115 A1 | 7/2004 | Levy et al. .................. 398/116 |
| 6,745,275 B2 | 6/2004 | Chang ........................ 710/305 | 2004/0144994 A1 | 7/2004 | Lee et al. .................... 257/200 |
| 6,751,703 B2 | 6/2004 | Chilton ....................... 711/113 | 2004/0199730 A1 | 10/2004 | Eggers et al. ............... 711/154 |
| 6,754,812 B1 | 6/2004 | Abdallah et al. ............ 712/234 | 2004/0216018 A1* | 10/2004 | Cheung ...................... 714/724 |
| 6,756,661 B2 | 6/2004 | Tsuneda et al. ............. 257/673 | 2004/0236885 A1* | 11/2004 | Fredriksson et al. ........ 710/100 |
| 6,760,833 B1 | 7/2004 | Dowling ...................... 712/34 | 2004/0243769 A1* | 12/2004 | Frame et al. ................ 711/148 |
| 6,771,538 B2 | 8/2004 | Shukuri et al. ........ 365/185.05 | 2005/0033874 A1 | 2/2005 | Futral et al. ................. 710/22 |
| 6,775,747 B2 | 8/2004 | Venkatraman .............. 711/137 | 2005/0044327 A1 | 2/2005 | Howard et al. ............. 711/147 |
| 6,782,465 B1* | 8/2004 | Schmidt ..................... 711/208 | 2005/0071542 A1 | 3/2005 | Weber et al. ............... 711/105 |
| 6,785,780 B1 | 8/2004 | Klein et al. ................. 711/148 | 2005/0146943 A1 | 7/2005 | Jeddeloh ................ 365/189.05 |
| 6,789,173 B1 | 9/2004 | Tanaka et al. ............... 711/147 | 2005/0177755 A1 | 8/2005 | Fung ........................... 713/300 |
| 6,792,059 B2 | 9/2004 | Yuan et al. .................. 375/354 | | | |
| 6,792,496 B2 | 9/2004 | Aboulenein et al. ........ 710/306 | | | |
| 6,795,899 B2 | 9/2004 | Dodd et al. ................. 711/137 | | | |
| 6,799,246 B1 | 9/2004 | Wise et al. .................. 711/117 | | | |
| 6,799,268 B1 | 9/2004 | Boggs et al. ................ 712/228 | | | |
| 6,804,760 B2 | 10/2004 | Wiliams ..................... 711/170 | | | |
| 6,804,764 B2 | 10/2004 | LaBerge et al. ............. 711/105 | | | |
| 6,807,630 B2 | 10/2004 | Lay et al. ...................... 713/2 | | | |
| 6,811,320 B1 | 11/2004 | Abbott ........................ 385/58 | | | |
| 6,816,947 B1 | 11/2004 | Huffman ..................... 711/151 | | | |
| 6,820,181 B2 | 11/2004 | Jeddeloh et al. ............ 711/169 | | | |
| 6,821,029 B1 | 11/2004 | Grung et al. ................ 385/92 | | | |
| 6,823,023 B1 | 11/2004 | Hannah ....................... 375/296 | | | |
| 6,845,409 B1* | 1/2005 | Talagala et al. ............. 710/20 | | | |
| 6,859,856 B2 | 2/2005 | Piau et al. ................... 711/103 | | | |
| 6,889,304 B2 | 5/2005 | Perego et al. ............... 711/170 | | | |
| 6,910,109 B2 | 6/2005 | Holman et al. ............. 711/156 | | | |
| 6,947,050 B2 | 9/2005 | Jeddeloh .................... 345/532 | | | |
| 6,952,745 B1 | 10/2005 | Dodd et al. ................. 710/35 | | | |
| 6,970,968 B1 | 11/2005 | Holman ........................ 711/5 | | | |
| 7,007,130 B1 | 2/2006 | Holman ........................ 711/5 | | | |
| 2001/0039612 A1 | 11/2001 | Lee ............................... 713/2 | | | |
| 2002/0033276 A1 | 3/2002 | Dabral et al. ............... 174/262 | | | |
| 2002/0112119 A1 | 8/2002 | Halbert et al. .............. 711/115 | | | |

FOREIGN PATENT DOCUMENTS

| | | |
|---|---|---|
| JP | 2001265539 A | 9/2001 |
| WO | WO 93/19422 | 9/1993 |
| WO | WO 98/57489 | 12/1998 |
| WO | WO 99/26139 | 5/1999 |
| WO | WO 02/27499 A2 | 4/2002 |

OTHER PUBLICATIONS

Intel, "Flash Memory PCI Add-In Card for Embedded Systems", Application Note AP-758, Sep. 1997, pp. i-13.

Micron Technology, Inc., "Synchronous DRAM Module 512MB/1GB (x72, ECC) 168-PIN Registered FBGA SDRAM DIMM", Micron Technology, Inc., 2002, pp. 1-23.

Shanley, T. et al., "PCI System Architecture", Third Edition, Mindshare, Inc., 1995, pp. 24-25.

Intel, "Intel 840 Chipset: 82840 Memory Controller Hub (MCH)", Datasheet, Oct. 1999, pp. 1-178.

"Free On-Line Dictionary of Computing" entry Flash Erasable Programmable Read-Only Memory, online May 17, 2004 [http://foldoc.doc.ic.ac.uk/foldoc/foldoc.cgi?flash+memory].

* cited by examiner

APPARATUS AND METHOD FOR DIRECT MEMORY ACCESS IN A HUB-BASED MEMORY SYSTEM

TECHNICAL FIELD

This invention relates to computer systems, and, more particularly, to a computer system including a system memory having a memory hub architecture.

BACKGROUND OF THE INVENTION

Computer systems use memory devices, such as dynamic random access memory ("DRAM") devices, to store data that are accessed by a processor. These memory devices are normally used as system memory in a computer system. In a typical computer system, the processor communicates with the system memory through a processor bus and a memory controller. The processor issues a memory request, which includes a memory command, such as a read command, and an address designating the location from which data or instructions are to be read. The memory controller uses the command and address to generate appropriate command signals as well as row and column addresses, which are applied to the system memory. In response to the commands and addresses, data are transferred between the system memory and the processor. The memory controller is often part of a system controller, which also includes bus bridge circuitry for coupling the processor bus to an expansion bus, such as a PCI bus.

Although the operating speed of memory devices has continuously increased, this increase in operating speed has not kept pace with increases in the operating speed of processors. Even slower has been the increase in operating speed of memory controllers coupling processors to memory devices. The relatively slow speed of memory controllers and memory devices limits the data bandwidth between the processor and the memory devices.

In addition to the limited bandwidth between processors and memory devices, the performance of computer systems is also limited by latency problems that increase the time required to read data from system memory devices. More specifically, when a memory device read command is coupled to a system memory device, such as a synchronous DRAM ("SDRAM") device, the read data are output from the SDRAM device only after a delay of several clock periods. Therefore, although SDRAM devices can synchronously output burst data at a high data rate, the delay in initially providing the data can significantly slow the operating speed of a computer system using such SDRAM devices.

One approach to alleviating the memory latency problem is to use multiple memory devices coupled to the processor through a memory hub. In a memory hub architecture, a system controller or memory controller is coupled over a high speed data link to several memory modules. Typically, the memory modules are coupled in a point-to-point or daisy chain architecture such that the memory modules are connected one to another in series. Thus, the memory controller is coupled to a first memory module over a first high speed data link, with the first memory module connected to a second memory module through a second high speed data link, and the second memory module coupled to a third memory module through a third high speed data link, and so on in a daisy chain fashion. Each memory module includes a memory hub that is coupled to the corresponding high speed data links and a number of memory devices on the module, with the memory hubs efficiently routing memory requests and responses between the controller and the memory devices over the high speed data links. Computer systems employing this architecture can have a higher bandwidth because a processor can access one memory device while another memory device is responding to a prior memory access. For example, the processor can output write data to one of the memory devices in the system while another memory device in the system is preparing to provide read data to the processor. Moreover, this architecture also provides for easy expansion of the system memory without concern for degradation in signal quality as more memory modules are added, such as occurs in conventional multi-drop bus architectures.

Although computer systems using memory hubs may provide superior performance, they nevertheless may often fail to operate at optimum speeds for a variety of reasons. For example, even though memory hubs can provide computer systems with a greater memory bandwidth, they still suffer from latency problems of the type described above. More specifically, although the processor may communicate with one memory device while another memory device is preparing to transfer data, it is sometimes necessary to receive data from one memory device before the data from another memory device can be used. In the event data must be received from one memory device before data received from another memory device can be used, the intervention of the processor continues to slow the operating speed of such computer systems. Another one of the reasons such computer systems fail to operate at optimum speed is that conventional memory hubs are essentially single channel systems since all control, address and data signals must pass through common memory hub circuitry. As a result, when the memory hub circuitry is busy communicating with one memory device, it is not free to communicate with another memory device.

One technique that has been used in computer systems to overcome the issues with processor intervention in moving data to and from memory as well as the single channel bottleneck is the use of direct memory access (DMA) operations. DMA operations are implemented through the use of DMA controllers included in the computer system which enable data to be moved into and out of memory without the intervention of the system processor. Such DMA operations and DMA controllers are well known in the art, and are often implemented in conventional computer systems. The DMA controller removes the need for the processor to be involved and manages the required data transfers into and out of the system memory. For example, when a DMA supported entity transfers data to the system memory, the DMA controller obtains control of the bus and coordinates the transfer of the data from the DMA supported entity to the system memory, without involvement by the processor. In this manner, latency issues resulting from processor intervention can be avoided during data transfers across the system bus. However, in many instances, even after data has been transferred to the system memory through a DMA operation, the processor nevertheless must move blocks of the data from one location to another within the system memory. For example, the operating system will direct a DMA operation to transfer data from a mass storage device into the system memory, only to have the processor then move the data again to another location in memory so the data can be used. As a result, the value of having DMA operations is diminished to some degree because the processor ultimately becomes involved by moving data around in memory despite the use of a DMA operation in the data transfer to and from the system memory.

Therefore, there is a need for a computer architecture that provides the advantages of a memory hub architecture and also minimizes the latency problems common in such systems.

SUMMARY OF THE INVENTION

The present invention is directed to a memory hub for a memory module having a DMA engine for performing DMA operations in system memory. The memory hub includes a link interface for receiving memory requests for access to at least one of the memory devices of the system memory, and further including a memory device interface for coupling to the memory devices, the memory device interface coupling memory requests to the memory devices for access to at least one of the memory devices. A switch for selectively coupling the link interface and the memory device interface is further included in the memory hub. Additionally, a direct memory access (DMA) engine is coupled through the switch to the memory device interface to generate memory requests for access to at least one of the memory devices to perform DMA operations.

In an aspect of the present invention, a method is provided for executing memory operations in a computer system having a processor, a system controller coupled to the processor, and a system memory having at least one memory module coupled to the system controller through a memory bus. The method includes writing DMA information to a location in the system memory representing instructions for executing memory operations in the system memory without processor intervention, obtaining control of the memory bus from the processor and system controller, accessing the location in the system memory to which the DMA information is written, and executing the memory operations represented by the instructions.

DETAILED DESCRIPTION OF THE INVENTION

Embodiments of the present invention are directed to a system memory having a memory hub architecture including direct memory access (DMA) capability to transfer data within the system memory without the intervention of a system processor. Certain details are set forth below to provide a sufficient understanding of the invention. However, it will be clear to one skilled in the art that the invention may be practiced without these particular details. In other instances, well-known circuits, control signals, and timing protocols have not been shown in detail in order to avoid unnecessarily obscuring the invention.

Figure 1:
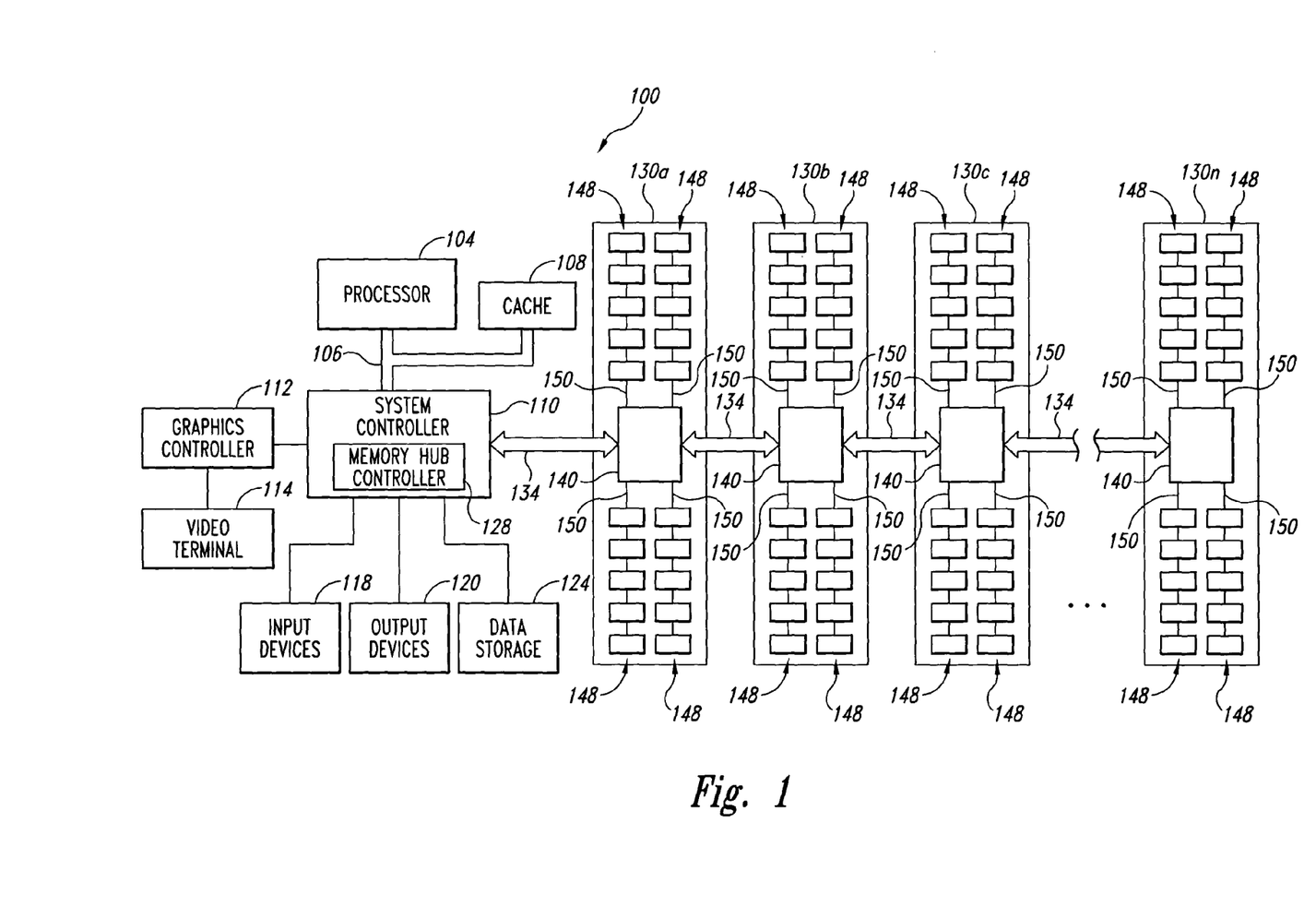
FIG. 1 is a block diagram of a computer system according to one example of the invention in which a memory hub is included in each of a plurality of memory modules.

A computer system 100 according to one example of the invention is shown in FIG. 1. The computer system 100 includes a processor 104 for performing various computing functions, such as executing specific software to perform specific calculations or tasks. The processor 104 includes a processor bus 106 that normally includes an address bus, a control bus, and a data bus. The processor bus 106 is typically coupled to cache memory 108, which, as previously mentioned, is usually static random access memory ("SRAM"). Finally, the processor bus 106 is coupled to a system controller 110, which is also sometimes referred to as a "North Bridge" or "memory controller."

The system controller 110 serves as a communications path to the processor 104 for a variety of other components. More specifically, the system controller 110 includes a graphics port that is typically coupled to a graphics controller 112, which is, in turn, coupled to a video terminal 114. The system controller 110 is also coupled to one or more input devices 118, such as a keyboard or a mouse, to allow an operator to interface with the computer system 100. Typically, the computer system 100 also includes one or more output devices 120, such as a printer, coupled to the processor 104 through the system controller 110. One or more data storage devices 124 are also typically coupled to the processor 104 through the system controller 110 to allow the processor 104 to store data or retrieve data from internal or external storage media (not shown). Examples of typical storage devices 124 include hard and floppy disks, tape cassettes, and compact disk read-only memories (CD-ROMs).

The system controller 110 includes a memory hub controller 128 that is coupled to several memory modules 130a, 130b, . . . 130n, which serve as system memory for the computer system 100. The memory modules 130 are preferably coupled to the memory hub controller 128 through a high-speed link 134, which may be an optical or electrical communication path or some other type of communications path. In the event the high-speed link 134 is implemented as an optical communication path, the optical communication path may be in the form of one or more optical fibers, for example. In such case, the memory hub controller 128 and the memory modules will include an optical input/output port or separate input and output ports coupled to the optical communication path.

The memory modules 130 are shown coupled to the memory hub controller 128 in a point-to-point arrangement in which the high-speed link 134 is formed from coupling together the memory hubs 140 of the memory modules 130. That is, the high speed link 134 is a bi-directional bus that couples the memory hubs 140 in series. Thus, information on the high speed link 134 must travel through the memory hubs 140 of "upstream" memory modules 130 to reach a "downstream" destination. For example, with specific reference to FIG. 1, information transmitted from the memory hub controller 128 to the memory hub 140 of the memory module 130c will pass through the memory hubs 140 of the memory modules 130a and 130b. However, it will be understood that other topologies may also be used, such as a coupling arrangement in which each of the memory modules 130 are coupled to the memory hub controller 128 over a high-speed link. A switching topology may also be used in which the memory hub controller 128 is selectively coupled to each of the memory modules 130 through a switch (not shown). Other topologies that may be used will be apparent to one skilled in the art.

As also shown in FIG. 1, the memory hub is coupled to four sets of memory devices 148 through a respective bus system 150. Each of the sets includes four memory devices 148 for a total of 20 memory devices 148 for each memory module 130. The bus systems 150 normally include a control bus, an address bus, and a data bus, as known in the art. However, it will be appreciated by those ordinarily skilled in the art that other bus systems, such as a bus system using a shared command/address bus, may also be used without departing from the scope of the present invention. It will be further appreciated that the arrangement of the memory devices 148, and the number of memory devices 148 can be modified without departing from the scope of the present invention. In the example illustrated in FIG. 1, the memory devices 148 are synchronous dynamic random access memory ("SDRAM") devices. However, memory devices other than SDRAM devices may, of course, also be used.

Figure 2:
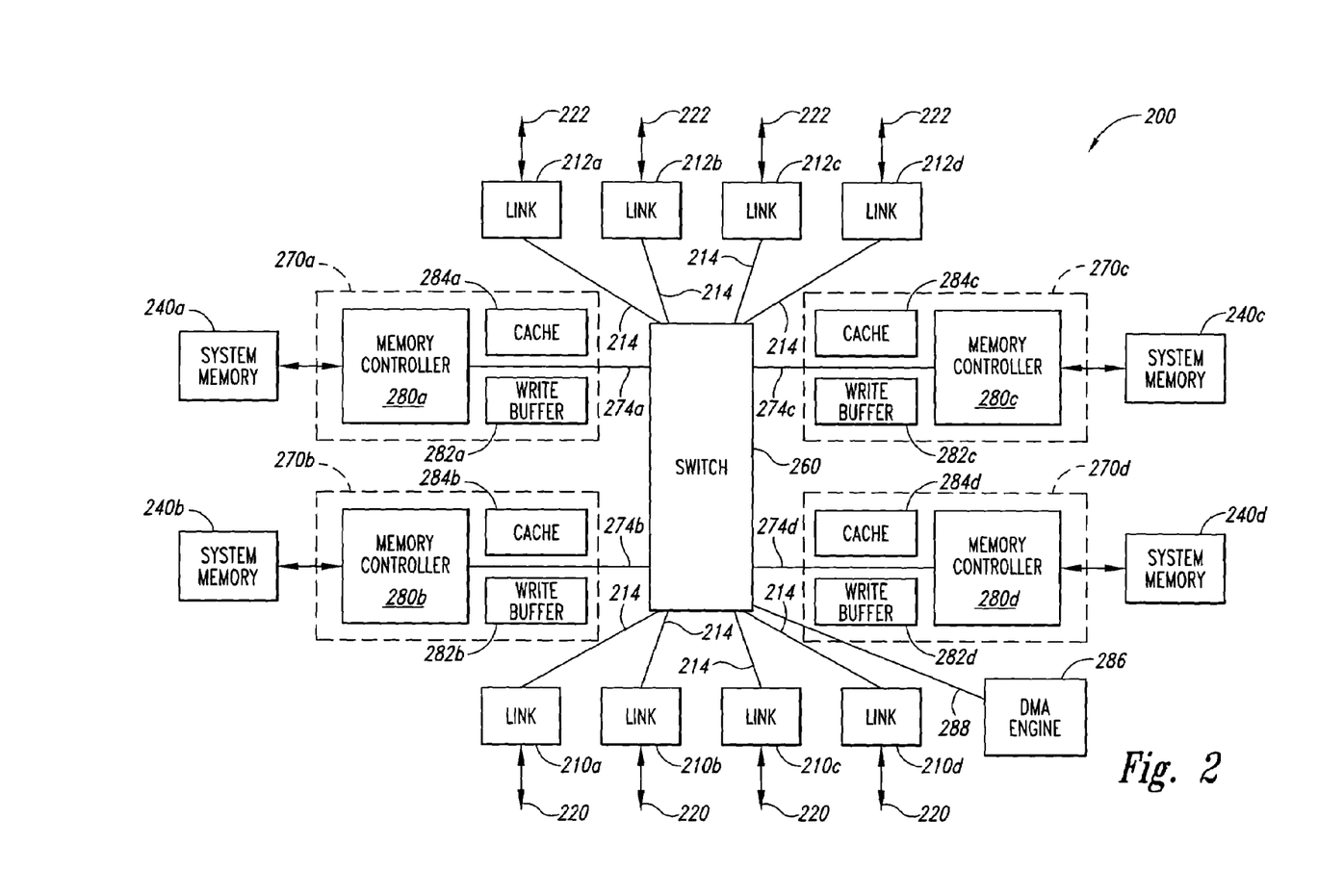
FIG. 2 is a block diagram of a memory hub used in the computer system of FIG. 1.

An embodiment of a memory hub 200 according to an embodiment of the present invention is shown in FIG. 2 that can be substituted for the memory hub 140 of FIG. 1. The memory hub 200 is shown in FIG. 2 as being coupled to four memory devices 240a-d, which, in the present example are conventional SDRAM devices. In an alternative embodiment, the memory hub 200 is coupled to four different banks of memory devices, rather than merely four different memory devices 240a-d, each bank typically having a plurality of memory devices. However, for the purpose of providing an example, the present description will be with reference to the memory hub 200 coupled to the four memory devices 240a-d. It will be appreciated that the necessary modifications to the memory hub 200 to accommodate multiple banks of memory is within the knowledge of those ordinarily skilled in the art.

Further included in the memory hub 200 are link interfaces 210a-d and 212a-d for coupling the memory module on which the memory hub 200 is located to a first high speed data link 220 and a second high speed data link 222, respectively. As previously discussed with respect to FIG. 1, the high speed data links 220, 222 can be implemented using an optical or electrical communication path or some other type of communication path. The link interfaces 210a-d, 212a-d are conventional, and include circuitry used for transferring data, command, and address information to and from the high speed data links 220, 222, as well known, for example, transmitter and receiver logic known in the art. It will be appreciated that those ordinarily skilled in the art have sufficient understanding to modify the link interfaces 210a-d, 212a-d to be used with the specific type of communication path, and that such modifications to the link interfaces 210a-d, 212a-d can be made without departing from the scope of the present invention. For example, in the event the high-speed data link 220, 222 is implemented using an optical communications path, the link interfaces 210a-d, 212a-d will include an optical input/output port and will convert optical signals coupled through the optical communications path into electrical signals.

The link interfaces 210a-d, 212a-d are coupled to the a switch 260 through a plurality of bus and signal lines, represented by busses 214. The busses 214 are conventional, and include a write data bus and a read data bus, although a single bi-directional data bus may alternatively be provided to couple data in both directions through the link interfaces 210a-d, 212a-d. It will be appreciated by those ordinarily skilled in the art that the busses 214 are provided by way of example, and that the busses 214 may include fewer or greater signal lines, such as further including a request line and a snoop line, which can be used for maintaining cache coherency.

The link interfaces 210a-d, 212a-d include circuitry that allow the memory hub 140 to be connected in the system memory in a variety of configurations. For example, the multi-drop arrangement, can be implemented by coupling each memory module to the memory hub controller 128 through either the link interfaces 210a-d or 212a-d. Alternatively, a point-to-point, or daisy chain configuration, as shown in FIG. 1, can be implemented by coupling the memory modules in series. For example, the link interfaces 210a-d can be used to couple a first memory module and the link interfaces 212a-d can be used to couple a second memory module. The memory module coupled to a processor, or system controller, will be coupled thereto through one set of the link interfaces and further coupled to another memory module through the other set of link interfaces. In one embodiment of the present invention, the memory hub 200 of a memory module is coupled to the processor in a point-to-point arrangement in which there are no other devices coupled to the connection between the processor 104 and the memory hub 200. This type of interconnection provides better signal coupling between the processor 104 and the memory hub 200 for several reasons, including relatively low capacitance, relatively few line discontinuities to reflect signals and relatively short signal paths.

The switch 260 is further coupled to four memory interfaces 270a-d which are, in turn, coupled to the system memory devices 240a-d, respectively. By providing a separate and independent memory interface 270a-d for each system memory device 240a-d, respectively, the memory hub 200 avoids bus or memory bank conflicts that typically occur with single channel memory architectures. The switch 260 is coupled to each memory interface through a plurality of bus and signal lines, represented by busses 274. The busses 274 include a write data bus, a read data bus, and a request line. However, it will be understood that a single bi-directional data bus may alternatively be used instead of a separate write data bus and read data bus. Moreover, the busses 274 can include a greater or lesser number of signal lines than those previously described.

In an embodiment of the present invention, each memory interface 270a-d is specially adapted to the system memory devices 240a-d to which it is coupled. More specifically, each memory interface 270a-d is specially adapted to provide and receive the specific signals received and generated, respectively, by the system memory device 240a-d to which it is coupled. Also, the memory interfaces 270a-d are capable of operating with system memory devices 240a-d operating at different clock frequencies. As a result, the memory interfaces 270a-d isolate the processor 104 from changes that may occur at the interface between the memory hub 230 and memory devices 240a-d coupled to the memory hub 200, and it provides a more controlled environment to which the memory devices 240a-d may interface.

The switch 260 coupling the link interfaces 210a-d, 212a-d and the memory interfaces 270a-d can be any of a variety of conventional or hereinafter developed switches. For example, the switch 260 may be a cross-bar switch that can simultaneously couple link interfaces 210a-d, 212a-d and the memory interfaces 270a-d to each other in a variety of arrangements. The switch 260 can also be a set of multiplexers that do not provide the same level of connectivity as a cross-bar switch but nevertheless can couple the some or all of the link interfaces 210a-d, 212a-d to each of the memory interfaces 270a-d. The switch 260 may also includes arbitration logic (not shown) to determine which memory accesses should receive priority over other memory accesses. Bus arbitration performing this function is well known to one skilled in the art.

With further reference to FIG. 2, each of the memory interfaces 270a-d includes a respective memory controller 280, a respective write buffer 282, and a respective cache memory unit 284. The memory controller 280 performs the same functions as a conventional memory controller by providing control, address and data signals to the system memory device 240a-d to which it is coupled and receiving data signals from the system memory device 240a-d to which it is coupled. The write buffer 282 and the cache memory unit 284 include the normal components of a buffer and cache memory, including a tag memory, a data memory, a comparator, and the like, as is well known in the art. The memory devices used in the write buffer 282 and the cache memory unit 284 may be either DRAM devices, static random access memory ("SRAM") devices, other types of memory devices, or a combination of all three. Furthermore, any or all of these memory devices as well as the other components used in the cache memory unit 284 may be either embedded or stand-alone devices.

The write buffer 282 in each memory interface 270a-d is used to store write requests while a read request is being serviced. In a such a system, the processor 104 can issue a write request to a system memory device 240a-d even if the memory device to which the write request is directed is busy servicing a prior write or read request. Using this approach, memory requests can be serviced out of order since an earlier write request can be stored in the write buffer 282 while a subsequent read request is being serviced. The ability to buffer write requests to allow a read request to be serviced can greatly reduce memory read latency since read requests can be given first priority regardless of their chronological order. For example, a series of write requests interspersed with read requests can be stored in the write buffer 282 to allow the read requests to be serviced in a pipelined manner followed by servicing the stored write requests in a pipelined manner. As a result, lengthy settling times between coupling write request to the memory devices 270a-d and subsequently coupling read request to the memory devices 270a-d for alternating write and read requests can be avoided.

The use of the cache memory unit 284 in each memory interface 270a-d allows the processor 104 to receive data responsive to a read command directed to a respective system memory device 240a-d without waiting for the memory device 240a-d to provide such data in the event that the data was recently read from or written to that memory device 240a-d. The cache memory unit 284 thus reduces the read latency of the system memory devices 240a-d to maximize the memory bandwidth of the computer system. Similarly, the processor 104 can store write data in the cache memory unit 284 and then perform other functions while the memory controller 280 in the same memory interface 270a-d transfers the write data from the cache memory unit 284 to the system memory device 240a-d to which it is coupled.

Further included in the memory hub 200 is a DMA engine 286 coupled to the switch 260 through a bus 288 which enables the memory hub 200 to move blocks of data from one location in the system memory to another location in the system memory without intervention from the processor 104. The bus 288 includes a plurality of conventional bus lines and signal lines, such as address, control, data busses, and the like, for handling data transfers in the system memory. As will be described in more detail below, the DMA engine 286 is able to read a link list in the system memory to execute the DMA memory operations without processor intervention, thus, freeing the processor 104 and the bandwidth limited system bus from executing the memory operations. The DMA engine 286 is preferably an embedded circuit in the memory hub 200. However, including a separate DMA device coupled to the memory hub 200 is also within the scope of the present invention. Additionally, the DMA engine 286 can include circuitry to accommodate DMA operations on multiple channels. Such multiple channel DMA engines are well known in the art and can be implemented using conventional technologies.

In an embodiment of the present invention, the processor 104 writes a list of instructions in the system memory for the DMA engine 286 to execute. The instructions include information used by the DMA engine 286 to perform the DMA operation, such as starting address of the block to move, ending address or count, destination address, the address of the next command block, and the like. The DMA engine 286 will execute a series of continuous commands and then jump to the next command list if directed to do so. The DMA engine 286 is programmed through a data structure that exists in one or more memory spaces. The data structure consists of some number of command blocks that provide information necessary to perform data transfer operations in the system memory. Each of the command blocks can be linked through a series of address pointers to form a linked list. The address of the first command block in the linked list is programmed through the I/O space. The DMA engine 286 is instructed to fetch and execute the first command block through the I/O space command register. After performing the requested data operation, an address pointer in the first command block is used to point the DMA engine 286 to the next command block. An address pointer in each successive command block is used to fetch and execute the next command block, forming a linked list. Each command block in the linked list is executed until a NULL pointer is encountered. An example of a NULL pointer is defined as an address consisting of all 1's. Upon detecting the NULL pointer, command block execution will halt, and a status bit will be set, indicating the command stream has terminated. Completion status can be contained in an I/O register in the memory hub 200. Additionally, a start flag can also be used to indicate that the DMA engine 286 has already begun executing the DMA operation. Other status bits can indicate if the command stream has terminated normally with no errors, or abnormally due to errors. The status information may optionally generate an interrupt to the host.

In alternative embodiments of the present invention, the DMA engine 286 can also be used for running diagnostics in the system. Known good data patterns can be loaded in memory of the memory hub 200, or known good system memory, and be used to test the system memory. A more detailed description of this type of application is provided in commonly assigned, co-pending U.S. patent application Ser. No. 10/644,522, entitled SYSTEM AND METHOD FOR ON-BOARD DIAGNOSTICS OF MEMORY MODULES, filed on Aug. 19, 2003, which is incorporated herein by reference.

Figure 3:
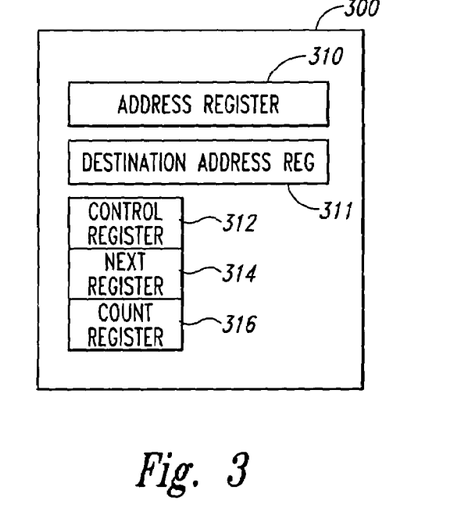
FIG. 3 is a block diagram of a portion of a DMA engine according to an embodiment of the present invention of the memory hub of FIG. 2.
Figure 4:
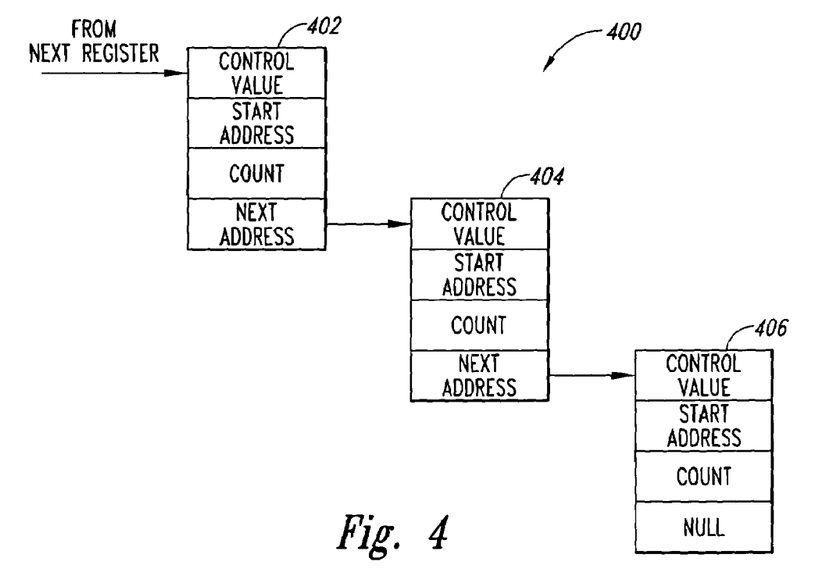
FIG. 4 is a block diagram of the tag structure according to an embodiment of the present invention used by the DMA engine of FIG. 3.

FIG. 3 is a block diagram illustrating portions of a DMA engine 300 and FIG. 4 is a block diagram illustrating a linked command list table 400 according to embodiments of the present invention. The DMA engine 300 can be substituted for the DMA engine 286 of the memory hub 200 (FIG. 2). It will be appreciated that FIG. 3 is merely a representation of the DMA engine 300, and those ordinarily skilled in the art are provided sufficient description herein in order to practice the present invention. However, it will be further appreciated that alternative DMA engines can also be used without departing from the scope of the present invention. The DMA engine 300 includes five registers: an address register 310, a destination address register 311, a control register 312, a next register 314, and a count register 316, to control DMA operations.

In operation, at the beginning of a block transfer, the starting address for the block is loaded into the address register 310. Additionally, a destination address of the location to which data is to be moved is loaded into the destination address register 311, and the length of the block is loaded into the count register 316. The control register 312 contains information relevant to the transfer, such as a bit indicating whether the address register 310 is to be incremented or decremented after each data item is transferred. In the present example, every time a data item is transferred by the DMA engine 300, the count register 316 is decremented and the address register 310 is incremented. Additionally, the destination address register 311 is incremented (or decremented, depending on the control settings). When the value of the count register 316 reaches zero, the block transfer has been completed. At this time, the value in the next register 314 is checked. If it points to a valid location in the system memory, the values contained in that object are loaded into the registers 310, 312, 314, and 316. A next block data transfer then begins automatically. However, if a NULL value, as previously described, is present in the next register 314, the DMA operation is complete.

The linked command list table 400 shown in FIG. 4 contains a plurality of link entries 402, 404, and 406, each of which contains the information necessary to reload registers 310, 312, 314, and 316. The link entries 402, 404, and 406 are stored in the system memory, as previously discussed, and are linked together by pointers corresponding to the next register 314. In FIG. 4, three link entries 402, 404, and 406 are shown. These link entries, plus an initial transfer defined by writing values directly into the registers 310, 312, 314, and 316 of the DMA engine 300, define a single DMA transfer having four separate parts. The value NEXT, contained in the next register 314, points to the first link entry 402. The first link entry 402 points to the next link entry 404 in the linked command, which in turn points to the final link entry 406. The final link entry 406 contains the NULL value as a pointer, indicating that it is the last link entry of a DMA command list. The NULL value is a reserved pointer value which does not point to a valid memory location, and is interpreted by the DMA engine 300 as a pointer to nothing. It will be appreciated that the link entries 402, 404, 406 are provided by way of example, and modifications thereto, such as including greater or fewer fields of information than that shown in FIG. 4, can be made without departing from the scope of the present invention.

Figure 5:
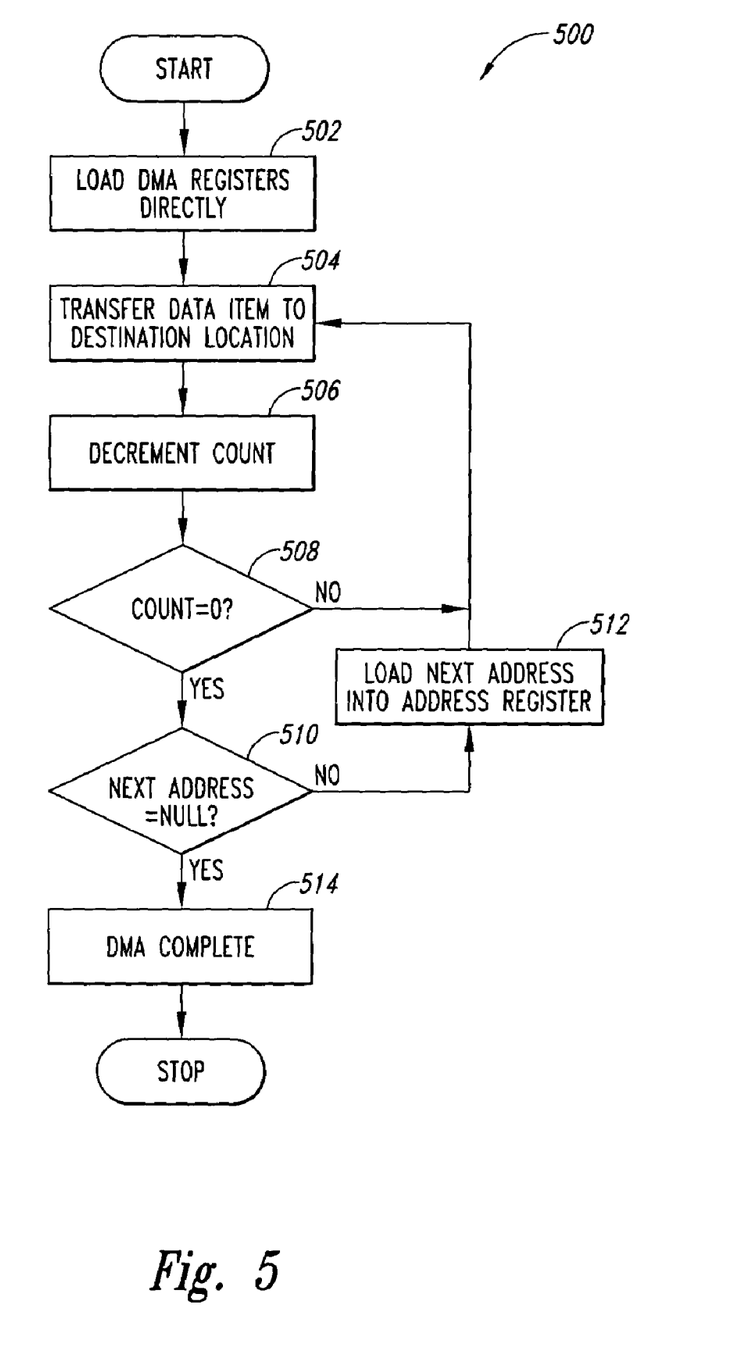
FIG. 5 is a flow diagram for operation of a DMA engine of FIG. 3 according to an embodiment of the present invention.

FIG. 5 is a flow diagram 500 illustrating the control flow used by the DMA engine 300 (FIG. 3) to make a series of consecutive block transfers. At a step 502, the DMA registers 310, 312, 314, and 316 are loaded with the appropriate values for the first data transfer. At this time, either before or after loading the registers directly, all of the information necessary for the link entries for this transfer must be loaded into the linked command list table 400 (FIG. 4). Loading of the registers is at the command of the processor 104 (FIG. 1) and loading of the linked command list 400 in the system memory is accomplished by the processor 104 as well.

At a step 504, one data item is transferred, and at a step 506, the value in the count register 316 is decremented to indicate that one data item has been transferred. The step 506 includes simultaneously incrementing or decrementing the value of the address register 310, depending upon the desired direction as set in the control register 312. At a step 508, the count value is checked to determine whether the count is complete. In one embodiment of the present invention, determination of whether the count is complete is accomplished by checking a carry out bit (not shown) from the count register 316. In the event the count value indicates that the data transfer is not complete, control returns to the step 504. However, if the count value in the count register 316 is equal to zero, control passes to a step 510, where the value in the next register 314 is tested to see if it is equal to the NULL value, as previously described. If a NULL value is not present, at a step 512 the next tag is loaded into the registers 310, 312, 314, and 316 in the DMA controller 300 from the linked command list table 400, and control returns to the step 504. Once the last link entry has been used, at a step 514 an indication is made to the processor 104 that the transfer is complete.

It will be appreciated by those ordinarily skilled in the art that the DMA engine 300 implements a "scatter-gather" capability for use in the system memory. When a large block of data is to be read into nonconsecutive blocks of memory, the processor 104 allocates the memory and sets up the linked command list table 400 through the DMA engine 300. A DMA transfer is then initiated, and the DMA engine 300 handles the entire transfer until it is completed. A similar technique can be used for gathering scattered blocks of data within the system memory in order to write them to consecutive blocks of memory. The processor 104 determines which blocks are to be written moved within the system memory, and their order, and sets up the linked command list table 400 through the DMA engine 300. A DMA transfer is then initiated, and is handled completely by the DMA engine 300 until it is completed. Since the linked command list table 400 is stored in the system memory, it is possible to keep several linked lists, for example, for each channel supported by the DMA engine 300. Moreover, since the linked command list table 400 is stored in the system memory, the only limit on the number of separate transfers which may be linked into one larger transfer for a channel is the number of remaining free memory locations within the system memory.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:
1. A memory module, comprising:
a plurality of memory devices; and
a memory hub, comprising:
  a link interface for receiving memory requests for access to at least one of the memory devices;
  at least one memory device interface, each of the at least one memory device interface having a memory controller and coupled to a respective number of the memory devices and coupling memory requests to the respective number of the memory devices for access to at least one of the memory devices, one of the at least one memory device interface operable to at least provide and receive signals specific to the respective number of the memory devices;
  a switch for selectively coupling the link interface and the memory device interface;

an I/O register operable to store status information indicative of completion of a DMA operation and error status of the DMA operation; and a direct memory access (DMA) engine coupled through the switch to the memory device interface, the DMA engine operable to generate memory requests for accessing at least one of the memory devices to perform DMA operations and further operable to program status information in the I/O register upon completion of the DMA operations.

2. The memory module of claim 1 wherein the memory hub is an embedded system having the link interface, the memory device interface, the switch, and the DMA engine residing in a single device.

3. The memory module of claim 1 wherein the switch comprises a cross-bar switch.

4. The memory module of claim 1 wherein the plurality of memory devices is a bank of memory devices simultaneously accessed during a memory operation.

5. The memory module of claim 1 wherein the plurality of memory devices comprise synchronous dynamic random access memory devices.

6. The memory module of claim 1 wherein the DMA engine comprises:
   an address register for storing a starting memory address for a DMA operation;
   a target address location for storing a target address of a location to which data is to be moved in the DMA operation;
   a count register for storing a count value indicative of the number of memory locations to be accessed in the DMA operation; and
   a next register for storing a value representative of the completion of the DMA operation or representative of a memory address corresponding to a link list including a starting memory address, a count value and a next memory address to be loaded into the address register, the count register, and the next register.

7. The memory module of claim 1 wherein the memory device interface comprises:
   a memory controller coupled to the switch through a memory controller bus and further coupled to the memory devices through a memory device bus;
   a write buffer coupled to the memory controller for storing memory requests directed to at least one of the memory devices to which the memory controller is coupled; and
   a cache coupled to the memory controller for storing data provided to the memory devices or retrieved from the memory devices.

8. A memory hub for a memory module having a plurality of memory devices, comprising:
   a link interface for receiving memory requests for access at least one of the memory devices;
   at least one memory device interface, each of the at least one memory device interface having a memory controller and coupled to a respective number of the memory devices, each of the at least one memory device interface coupling memory requests to the respective number of the memory devices for access to at least one of the memory devices, one of the at least one memory device interface operable to at least provide and receive signals specific to the respective number of the memory devices;
   a switch for selectively coupling the link interface and the memory device interface;

an I/O register operable to store status information indicative of completion of a DMA operation and error status of the DMA operation; and a direct memory access (DMA) engine coupled through the switch to the memory device interface, the DMA engine operable to generate memory requests for accessing at least one of the memory devices to perform DMA operations and further operable to program status information in the I/O register upon completion of the DMA operations.

9. The memory hub of claim 8 wherein the link interface, the memory device interface, the switch, and the DMA engine are embedded systems residing in a single device.

10. The memory hub of claim 8 wherein the switch comprises a cross-bar switch.

11. The memory hub of claim 8 wherein the DMA engine comprises:
   an address register for storing a starting memory address for a DMA operation;
   a target address location for storing a target address of a location to which data is to be moved in the DMA operation;
   a count register for storing a count value indicative of the number of memory locations to be accessed in the DMA operation; and
   a next register for storing a value representative of the completion of the DMA operation or representative of a memory address corresponding to a link list including a starting memory address, a count value and a next memory address to be loaded into the address register, the count register, and the next register.

12. The memory hub of claim 8, wherein the memory device interface comprises:
   a memory controller coupled to the switch through a memory controller bus and further coupled to the memory devices through a memory device bus;
   a write buffer coupled to the memory controller for storing memory requests directed to at least one of the memory devices to which the memory controller is coupled; and
   a cache coupled to the memory controller for storing data provided to the memory devices or retrieved from the memory devices.

13. A memory system, comprising:
   a memory bus on which memory requests are provided; and
   a plurality of memory modules coupled to the memory bus, each memory module having a plurality of memory devices and a memory hub, the memory hub comprising:
      a link interface coupled to receive memory requests for access to at least one of the memory devices of the memory module on which the link interface is located;
      at least one memory device interface, each of the at least one memory device interface having a memory controller and coupled to a respective number of the memory devices and coupling memory requests to the respective number of the memory devices for access to at least one of the memory devices, one of the at least one memory device interface operable to at least provide and receive signals specific to the respective number of the memory devices;
      a switch for selectively coupling the link interface and the memory device interface;
      an I/O register operable to store status information indicative of completion of a DMA operation and error status of the DMA operation; and a direct memory access (DMA) engine coupled through the switch to the memory device interface and the link interface, the DMA engine operable to generate memory requests for accessing at least one of the memory devices to perform DMA operations and further operable to program status information in the I/O register upon completion of the DMA operations.

14. The memory system of claim 13 wherein the memory hub is an embedded system having the link interface, the memory device interface, the switch, and the DMA engine residing in a single device.

15. The memory system of claim 13 wherein the memory bus comprises a high-speed memory bus.

16. The memory system of claim 13 wherein the memory bus comprises a high-speed optical memory bus and wherein the link interface comprises an optical memory bus interface circuit for translating optical signals and electrical signals.

17. The memory system of claim 13 wherein a plurality of memory modules are included in the memory system and a first memory module of the plurality of memory modules is coupled to the memory bus and the remaining memory modules of the plurality are coupled in series with the first memory module.

18. The memory system of claim 13 wherein a plurality of memory modules are included in the memory system and each of the plurality of memory modules are coupled directly to the memory bus through a respective link interface.

19. The memory system of claim 13 wherein the switch of the memory hub comprises a cross-bar switch.

20. The memory system of claim 13 wherein the plurality of memory devices of a memory module represents a bank of memory devices simultaneously accessed during a memory operation.

21. The memory system of claim 13 wherein the plurality of memory devices of the memory modules comprise synchronous dynamic random access memory devices.

22. The memory system of claim 13 wherein the DMA engine of the memory hub comprises:
an address register for storing a starting memory address of a memory location in the memory system at which a DMA operation begins;
a target address location for storing a target address of a memory location in the memory system to which data is to be moved in the DMA operation;
a count register for storing a count value indicative of the number of memory locations to be accessed in the DMA operation; and
a next register for storing a value representative of the completion of the DMA operation or representative of a memory address corresponding to a link list including a starting memory address, a count value and a next memory address to be loaded into the address register, the count register, and the next register.

23. The memory system of claim 13, wherein the memory device interface comprises:
a memory controller coupled to the switch through a memory controller bus and further coupled to the memory devices through a memory device bus;
a write buffer coupled to the memory controller for storing memory requests directed to at least one of the memory devices to which the memory controller is coupled; and
a cache coupled to the memory controller for storing data provided to the memory devices or retrieved from the memory devices.

24. A computer system, comprising:
a central processing unit ("CPU");
a system controller coupled to the CPU, the system controller having an input port and an output port;
an input device coupled to the CPU through the system controller;
an output device coupled to the CPU through the system controller;
a storage device coupled to the CPU through the system controller;
a plurality of memory modules, each memory module comprising:
a plurality of memory devices; and
a memory hub, comprising:
a link interface coupled to receive memory requests for access to at least one of the memory devices of the memory module on which the link interface is located;
at least one memory device interface, each of the at least one memory device interface having a memory controller and coupled to a respective number of the memory devices and coupling memory requests to the respective number of the memory devices for access to at least one of the memory devices, one of the at least one memory device interface operable to at least provide and receive signals specific to the respective number of the memory devices;
a switch for selectively coupling the link interface and the memory device interface;
an I/O register operable to store status information indicative of completion of a DMA operation and error status of the DMA operation; and
a direct memory access (DMA) engine coupled through the switch to the memory device interface and the link interface, the DMA engine operable to generate memory requests for accessing at least one of the memory devices of the plurality of memory modules to perform DMA operations and further operable to program status information in the I/O register upon completion of the DMA operations; and
a communications link coupled between the system controller and the plurality of memory modules for coupling memory requests and data between the system controller and the memory modules.

25. The computer system of claim 24 wherein the communications link comprises a high-speed memory bus.

26. The computer system of claim 24 wherein the memory hub is an embedded system having the link interface, the memory device interface, the switch, and the DMA engine residing in a single device.

27. The computer system claim 24 wherein the communications link comprises a high-speed optical memory bus and wherein the link interface of the memory hub comprises an optical memory bus interface circuit for translating optical signals and electrical signals.

28. The computer system of claim 24 wherein a plurality of memory modules are included in the computer system and a first memory module of the plurality of memory modules is coupled to the communications link and the remaining memory modules of the plurality are coupled in series with the first memory module.

29. The computer system of claim 24 wherein a plurality of memory modules are included in the computer system and each of the plurality of memory modules are coupled directly to the memory bus through a respective link interface.

30. The computer system of claim 24 wherein the switch of the memory hub comprises a cross-bar switch.

31. The computer system of claim 24 wherein the plurality of memory devices of a memory module represents a bank of memory devices simultaneously accessed during a memory operation.

32. The computer system of claim 24 wherein the plurality of memory devices of the memory module comprise synchronous dynamic random access memory devices.

33. The computer system of claim 24 wherein the DMA engine of the memory hub comprises:
   an address register for storing a starting memory address of a memory location in the memory system at which a DMA operation begins;
   a target address location for storing a target address of a memory location in the memory system to which data is to be moved in the DMA operation;
   a count register for storing a count value indicative of the number of memory locations to be accessed in the DMA operation; and
   a next register for storing a value representative of the completion of the DMA operation or representative of a memory address corresponding to a link list including a starting memory address, a count value and a next memory address to be loaded into the address register, the count register, and the next register.

34. The computer system of claim 24, wherein the memory device interface comprises:
   a memory controller coupled to the switch through a memory controller bus and further coupled to the memory devices through a memory device bus;
   a write buffer coupled to the memory controller for storing memory requests directed to at least one of the memory devices to which the memory controller is coupled; and
   a cache coupled to the memory controller for storing data provided to the memory devices or retrieved from the memory devices.

* * * * *

UNITED STATES PATENT AND TRADEMARK OFFICE
CERTIFICATE OF CORRECTION

PATENT NO. : 7,389,364 B2  
APPLICATION NO. : 10/625132  
DATED : June 17, 2008  
INVENTOR(S) : Jeddeloh Page 1 of 1

It is certified that error appears in the above-identified patent and that said Letters Patent is hereby corrected as shown below:

On the face page, in field (56), under "Other Publications", in column 2, line 2, delete "Swithcing," and insert -- Switching, --, therefor.

On the face page, in "Primary Examiner", in column 2, line 1, delete "Erin J Sorrell" and insert -- Eron J Sorrell --, therefor.

Signed and Sealed this

Thirtieth Day of September, 2008

JON W. DUDAS  
*Director of the United States Patent and Trademark Office*